United States Patent [19]
Kim

[11] Patent Number: 5,638,952
[45] Date of Patent: Jun. 17, 1997

[54] PORTABLE STORAGE CASE FOR A PLURALITY OF COMPACT DISCS AND/OR 3.5 INCH FLOPPY DISKETTERS

[76] Inventor: Jung Won Kim, 20620 Anza Ave., #27, Torrance, Calif. 90503

[21] Appl. No.: 639,481

[22] Filed: Apr. 29, 1996

[51] Int. Cl.$^6$ ................................................ B65D 85/57
[52] U.S. Cl. ........................... 206/307.1; 206/308.1; 206/308.3
[58] Field of Search ........................... 206/232, 309, 206/310, 311, 312, 313, 477, 478, 480, 307.1, 308.1, 308.3, 307

[56] References Cited

U.S. PATENT DOCUMENTS

| | | |
|---|---|---|
| 4,411,481 | 10/1983 | Berkman .......................... 206/307.1 X |
| 5,246,107 | 9/1993 | Long . |
| 5,249,677 | 10/1993 | Lim . |
| 5,285,893 | 2/1994 | Misterka . |
| 5,310,054 | 5/1994 | Stumpff et al. ...................... 206/309 X |
| 5,495,940 | 3/1996 | Taniyama ............................ 206/308.1 |

*Primary Examiner*—Jacob K. Ackun
*Attorney, Agent, or Firm*—Eugene Oak

[57] ABSTRACT

A portable storage case which can accommodate both compact discs and 3.5 inch floppy diskettes. The portable storage case comprises a plurality of pages, each page having a plurality of storage sections, each storage section accommodating one compact disc or one floppy diskette. Each storage section comprises a plurality of fastening prongs which are arranged in a circular orientation; a compact disc or a floppy diskette may be stored in one of these sections by depressing it into the circular orientation of the fastening prongs. Because the fastening prongs are flexible and yielding, they clamp onto the disc/diskette and hold it firmly in place.

1 Claim, 2 Drawing Sheets

PORTABLE STORAGE CASE FOR A PLURALITY OF COMPACT DISCS AND/OR 3.5 INCH FLOPPY DISKETTERS

BACKGROUND OF THE INVENTION

1. Field of the Invention

This invention relates generally to portable multi-purpose storage cases, and specifically to a storage case which accommodates both compact discs and 3.5 inch floppy diskettes.

2. Description of the Prior Art

Numerous prior art exist which teach several variations of portable storage cases intended to accommodate both compact discs and floppy diskettes. However, none of the prior art disclose a storage case similar to the present invention.

U.S. Pat. No. 5,285,893 to Misterka discloses a storage case for multiple compact discs and related printed material. The mechanism in which the compact disc is fastened to the storage case corresponds to the aperture located in the center of a conventional compact disc. The mechanism comprises a plurality of flexible prongs arranged in a circular orientation, wherein the diameter of the circular orientation is approximately equal to the diameter of the circular aperture of a conventional compact disc. When the compact disc is pressed onto the prongs, the prongs contract and occupy the center aperture of the compact disc.

U.S. Pat. No. 5,249,677 to Lim discloses a compact disc case wherein the mechanism in which a compact disc is fastened to the storage case corresponds to the aperture located in the center of a conventional compact disc. This mechanism comprises a circular stud with a plurality of incisions which allow the stud to contract, thereby fitting through the aperture of the compact disc when the disc is pressed down on the stud.

U.S. Pat. No. 5,246,107 to Long et al. discloses a wallet style compact disc storage unit. The mechanism in which a compact disc is fastened to the storage unit is similar to the mechanism disclosed by Misterka.

The previously mentioned inventions are storage units that are only designed to accommodate compact discs. The present invention can accommodate both compact discs and floppy diskettes. The previously mentioned inventions also have fastening mechanisms which require that a stud or a plurality of prongs are fitted through the center aperture. The center aperture of the compact disc is not utilized for fastening purposes in the present invention.

Accordingly, the principle object of the present invention is to provide a portable storage case which can accommodate both compact discs and 3.5 inch floppy diskettes.

It is another object of the present invention to provide a portable storage case which accommodates compact discs without utilizing the center aperture of the compact discs.

SUMMARY OF THE INVENTION

The present invention is a portable storage case which can accommodate both compact discs and 3.5 inch floppy diskettes. Although the present invention may assume a book-like form in which the compact discs and floppy diskettes are displayed on page-like display, the nature of the invention is not contingent upon how the compact discs/floppies are displayed, but the principle of the invention is the fastening mechanism which bind them to the storage unit. The mechanism comprises a plurality of prongs circularly oriented which clamp around the circumference of a compact disc. When the disc is depressed onto the prong orientation, the prongs bend elastically in an outward radial direction until the disc is in place. The prongs fasten around a floppy disk in a similar manner.

These together with other objects are described clearly in the claims annexed to and forming a part of this disclosure. For a better understanding of the invention, its operating advantages and the specific objects attained by its use, reference should be made to-the accompanying drawings and descriptive matter in which there are illustrated preferred embodiments of the invention.

BRIEF DESCRIPTION OF THE DRAWINGS

For a better understanding of the principle and nature of the present invention, reference should be made to the following detailed description taken in connection with the accompanying drawings in which.

DETAILED DESCRIPTION OF THE PREFERRED EMBODIMENT

Figure 1:
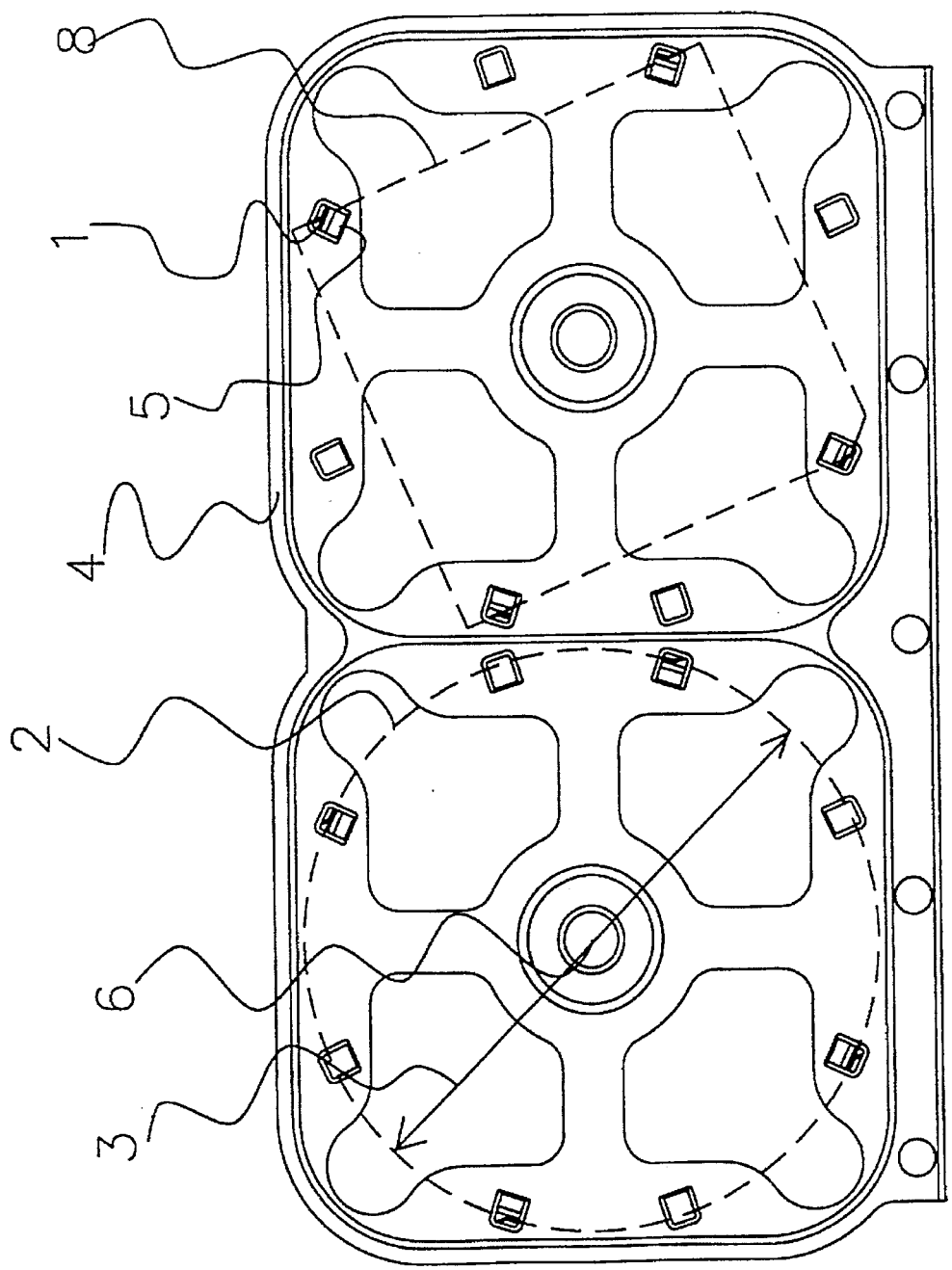
FIG. 1 is a front elevational view of the portable storage case.

Referring to FIG. 1, the present invention comprises a plurality of fastening prongs 1 which are arranged in a circular orientation 2 having a diameter 3 approximately equal to the diameter of a conventional compact disc. A plurality of circular orientations 2 are arranged on a page 4. Each of the fastening prongs 1 are connected to the page 4 only at the base 5 of the fastening prong 1. The prong 1 is free to bend elastically because it is connected to the page 4 by its base 5 only. The bases 5 of the fastening prongs 1 are oriented in a radially inward direction towards the center 6 of the circular orientation 2.

Figure 2:
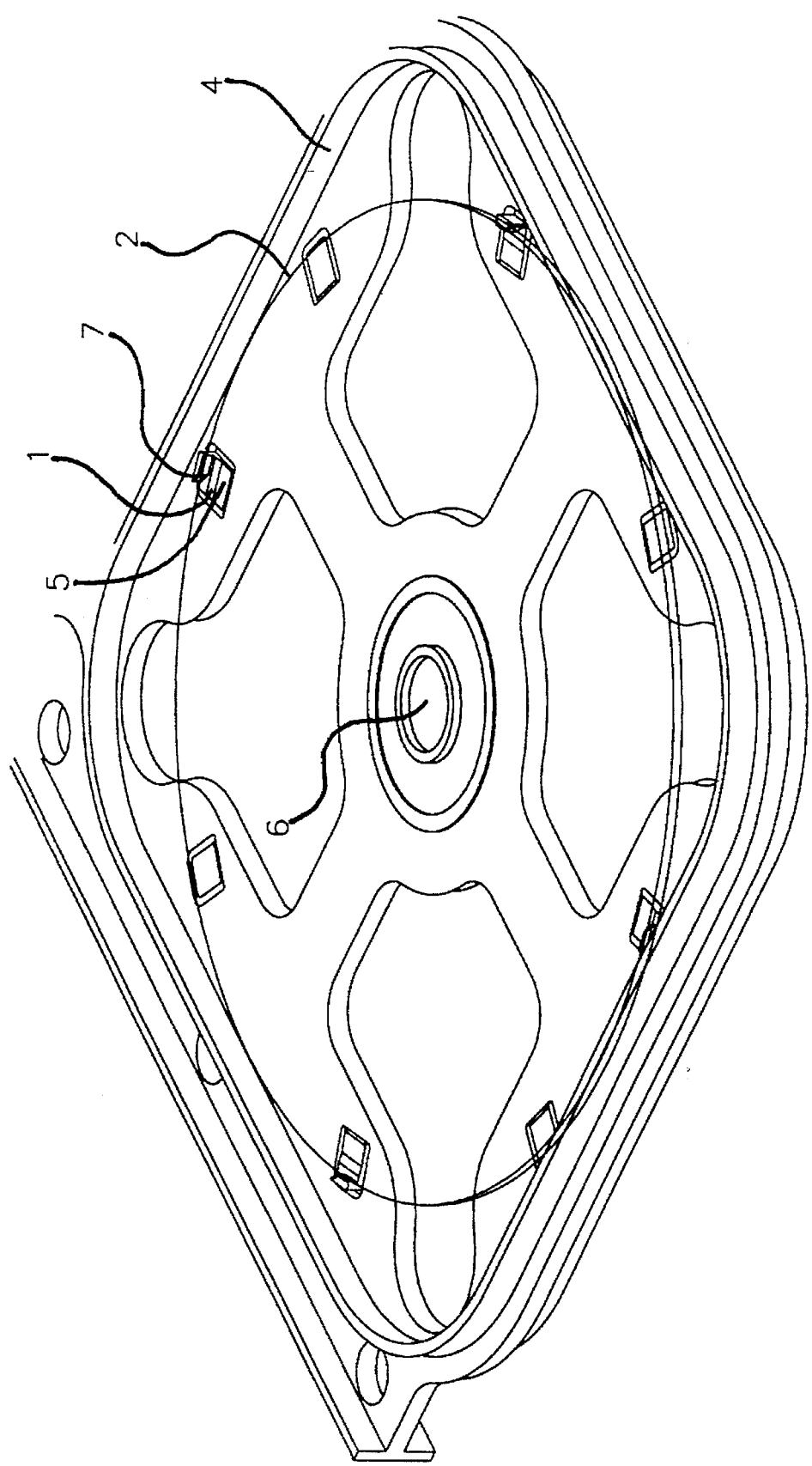
FIG. 2 is a perspective magnified view of the portable storage case.

The plurality of fastening prongs 1 when used in conjunction with each other can accommodate a compact disc. Referring to FIG. 2 which is a magnified perspective view of a fastening prong 1, a compact disc can be fastened onto a page 4 by placing it on top of the circular orientation 2 of fastening prongs 1 and depressing it. Because the prongs 1 are flexible, the compact disc is clamped into place by the plurality of prongs 1 arranged around the circumference of the compact disc.

The plurality of fastening prongs 1 when used in conjunction with each other can accommodate a 3.5 inch floppy diskette. Referring to FIG. 2, the fastening prongs 1 have a diagonal bevel 7. Referring to FIG. 1, when a floppy diskette 8 is placed on top of the circular orientation 2 at a slight angle, the diagonal bevels 7 of the fastening prongs 1 allow the fastening prongs 1 to accommodate the floppy diskette 8. The diagonal bevels 7 are parallel to the edges of the floppy diskette 8, and when the floppy diskette 8 is placed above the circular orientation 2, four prongs 1, one at each corner of the diskette 8, clamp the diskette in place.

Each page 4 may have a plurality of circular orientations 2; thus each page 4 may accommodate a plurality of compact discs and/or floppy diskettes. A portable storage case may be formed by affixing a plurality of pages 4 together.

In the claims:

What is claimed as being new and therefore desired to be protected by letter patent of the United States is as follows:

1. A portable compact disc and 3.5 inch floppy diskette storage case wherein said portable storage case comprises a plurality of pages, each said page divided into a plurality of storage sections which each accommodate a single compact disc or a single floppy diskette;

a. Said storage section comprising a plurality of fastening prongs, wherein said fastening prongs are equally spaced and arranged in a circular orientation, said circular orientation of said fastening prongs having a diameter approximately equal to that of a conventional compact disc;

b. said plurality of fastening prongs being connected to said storage section only by the plurality of bases of said plurality of fastening prongs, allowing said fastening prongs to be flexible and yielding, wherein said plurality of bases are connected to said storage section in a radially inward direction with respect to the center of said circular orientation;

c. said fastening prongs clamping around circumference of said compact disc when said compact disc is depressed on said circular orientation of said fastening prongs;

d. said fastening prongs having a diagonal bevel along one side of each of said fastening prongs, thereby accommodating for the edge of a 3.5 inch floppy diskette if said floppy diskette is oriented at said center of said circular orientation and at a proper angle with respect to said storage section, said fastening prongs clamping on said edges of said diskette.

* * * * *